United States Patent

Horowitz et al.

[15] 3,646,452

[45] Feb. 29, 1972

[54] SECOND ORDER DIGITAL PHASE-LOCK LOOP

[72] Inventors: Isaac Horowitz, Rehovot, Israel; Lawrence A. Laurich, Mahopac, N.Y.; Fred W. Niccone, Boulder, Colo.

[73] Assignee: International Business Machines Corporation, Armonk, N.Y. by said Laurich and said Niccone

[22] Filed: Feb. 16, 1971

[21] Appl. No.: 115,447

[52] U.S. Cl. ................................ 328/63, 307/269, 307/295, 328/72, 328/133, 328/155, 331/17, 331/25

[51] Int. Cl. ........................................ H03k 1/00, H03k 5/18

[58] Field of Search ......................... 307/232, 233, 269, 295; 328/63, 72, 133, 134, 155; 331/10, 17, 25

[56] References Cited

UNITED STATES PATENTS 3,562,661 2/1971 Crumb et al. ........................ 331/17 X

*Primary Examiner*—Stanley D. Miller, Jr.
*Attorney*—Hanifin & Jancin and Homer L. Knearl

[57] ABSTRACT

A digital second order phase-lock loop is built up utilizing all-digital circuits. The purpose of the loop is to synchronize a data gate signal in the synchronous data receiver with an incoming train of data pulses. One application of the system is the production of gate signals synchronized with data pulses read from a magnetic recording. The loop consists of six basic parts: (1) a reference counter with controllable start and stop counts; (2) a master oscillator to advance the reference counter; (3) a phase detector to detect the phase difference between a data pulse and the digital ramp simulated by the advancing count in the reference counter; (4) a phase scaler for generating an immediate phase correction factor for the reference counter; (5) a frequency memory which is updated and thereby tracks the frequency of the data pulses; and (6) a frequency scaler for generating an immediate and continuing frequency correction for the reference counter. The loop symmetrically corrects the digital ramp simulated by the reference counter.

10 Claims, 5 Drawing Figures

INVENTORS
ISAAC HOROWITZ
LAWRENCE A. LAURICH
FRED W. NICCORE
BY H L Kneal
ATTORNEY

SECOND ORDER DIGITAL PHASE-LOCK LOOP

CROSS-REFERENCE TO RELATED APPLICATION

An alternative implementation of a digital phase-lock loop is described and claimed in copending application Ser. No. 791,213, filed Jan. 15, 1969, now U.S. Pat. No. 3,562,661, and entitled, "A Digital Automatic Phase Control System," by D. F. Crumb et al. and assigned to the same assignee as this invention.

BACKGROUND OF THE INVENTION

1. Field of the Invention

The invention relates to synchronizing a data gate in a synchronous data receiver to incoming data pulses. One application of the invention is in the area of magnetic recording systems to produce reference clock pulses or data gate signals that are synchronized with the incoming self-clocking data pulses read from the magnetic recording. A self-clocking data signal may be looked upon as a signal requiring a data transition every few bit periods, and the bit periods are of a predetermined duration plus or minus a tolerance factor.

2. Description of the Prior Art

Reference clocking in the magnetic recording systems of the past have generally been achieved by using analog phase-lock loops. However, analog phase-lock loops have several inherent disadvantages and limitations. These disadvantages include the necessity for manual potentiometer adjustments and a lockin time as long as 20 bit periods for a 20 percent frequency offset between the input frequency and the nominal output frequency. Furthermore, the analog error signal-producing devices are narrow band devices and are comparatively unstable.

The prior art also contains oscillator disciplining systems which operate in the digital mode wherein a digital error signal is used to control the disciplined oscillators. However, these digital systems make only frequency corrections to the disciplined oscillator and do not included phase corrections.

The cross-referenced application teaches a truly all-digital phase-lock loop providing both digital frequency corrections and digital phase corrections. The present invention also is an all-digital phase-lock loop and provides digital phase correction and digital frequency correction. In addition, the present invention is an improvement over the cross-referenced application. The present invention is a much simpler structure and provides a more immediate response for the frequency corrections. Also, the frequency corrections are symmetrical since the period of the reference waveform is increased in substantially equal amounts on each side of the phase detection reference point.

SUMMARY OF THE INVENTION

The invention may be summarized as a digital clocking system employing an all-digital phase-lock loop wherein very fast response of the loop is accomplished by feeding immediate phase and frequency corrections back to a reference counter. The reference counter simulates a reference ramp signal which is synchronized to an incoming data signal by the phase and frequency corrections. One output of the reference counter is a data gate signal used to gate data pulses to decoding hardware.

The immediate phase correction of the counter is accomplished by feeding in a phase correction quantity obtained by multiplying the phase error by a scale factor. The phase correction is a one-shot correction occurring almost immediately after the detection of phase error between the incoming data pulse and the reference ramp. The frequency correction is accomplished by tracking the frequency of the incoming data pulses. The tracking is accomplished by use of a memory to monitor the phase error of incoming data pulses. Based upon the updated frequency stored in the memory, a frequency correction quantity is derived by multiplying the updated frequency by a scale factor. Frequency correction is continuous during each cycle of the reference ramp and is updated immediately upon the detection of each phase error.

As an additional feature, the frequency correction of the reference ramp is symmetrical. In particular, the frequency correction is applied equally to both the start and stop values of the reference ramp. The start and stop values control the period of the reference ramp and thereby the frequency of the reference ramp.

Also, as an additional feature, phase error averaging may be used as a part of the phase correction. Phase error averaging is accomplished by averaging the phase error from a previous data pulse with the present data pulse. The phase correction signal is then the phase error average multiplied by a scale factor. Phase error averaging is used to balance out opposite phase error in successive data pulses. This prevents the phase-lock loop from overreacting to symmetrical phase shift.

The great advantage of this invention is that it is digital and thus carries all the advantages of a digital phase-lock loop. Also, both the phase and frequency corrections are made immediately. The response of the system is rapid because of the simplicity of design.

Another advantage of this system is that is can make the frequency corrections by symmetrically extending or diminishing the period of the reference ramp signal. If the reference ramp signal were changed in frequency by extending one end of the ramp, it is possible that the next data transition would fall on the wrong side of the flyback for the ramp signal. In other words, instead of a positive phase error being detected at the next transition, a negative phase error might be detected. With symmetrical frequency correction, the reference ramp signal is always extended symmetrically so that it will tend to bracket each data transition as it should.

The foregoing and other features and advantages of the invention will be apparent from the following more particular description of a preferred embodiment of the invention as illustrated in the accompanying drawings.

DESCRIPTION OF THE PREFERRED EMBODIMENT

Figure 1:
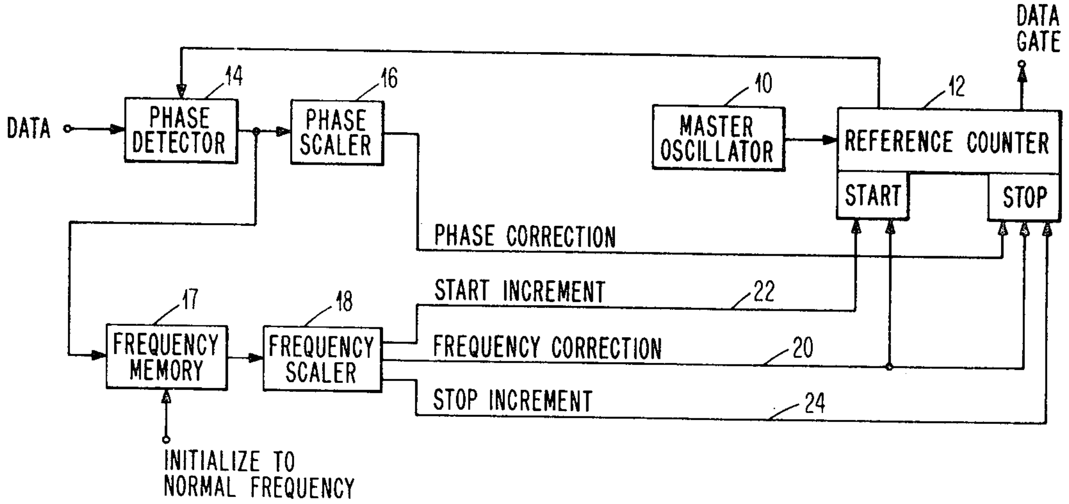
FIG. 1 is a block diagram of the all-digital phase-lock loop in which there is provided a frequency memory, a frequency scaler, and phase scaler; the frequency and phase corrections are fed back to both the start and stop controls of the reference counter.

FIG. 1 shows a block diagram of the basic all-digital phase-lock loop. The overall function of the loop is to produce an output data gate signal which will bracket the input data pulse signals. When the all-digital phase-lock loop is used in reading magnetically recorded information, the input signals are pulses representative of the data transitions read from the magnetic tape.

The components of the all-digital phase-lock loop are interconnected as follows. A master oscillator 10 advances the count in a reference counter 12. The reference counter counts cyclically up from a negative value to a positive value. At some count in the cycle, the reference counter generates the output data gate signal. Therefore, the data gate can be adjusted by adjusting the start and stop values and thus the cycle period of the counter.

The start and stop values are symmetrically positioned about zero. The zero count in the reference counter represents the time at which a data transition or data pulse should occur. Phase detector 14 monitors the count in the reference counter 12 and the occurrence of data pulses. The value in the reference counter at the occurrence of a data pulse is indicative of the phase difference between a data pulse and the reference ramp simulated by the reference counter. For example, if the count in the counter is +2 when the data pulse occurs, this indicates that the data pulse has a phase error of magnitude 2 and is lagging behind the reference ramp signal.

The phase error signal is passed to a phase scaler 16, a frequency memory 17, and a frequency scaler 18. The function of the phase scaler is to produce a scaled phase correction signal in response to the phase error signal. The frequency memory 17 is initialized to a normal frequency and, thereafter, is updated by the detected phase error to track frequency variations in the data signal. The frequency scaler 18 generates the frequency correction signal based upon the updated frequency value stored in memory 17. The scaling constants, K1 and K2, for the phase scaler and frequency scaler will be described hereinafter with reference to FIG. 2.

The output of the phase scaler 16 is the phase correction factor which is fed back to the stop controls of the reference counter 12. The stop controls specify the stop value at the top of the reference ramp. Thus, an immediate phase adjustment of the reference ramp signal is accomplished by adding the positive or negative phase correction factor to the stop value in the reference counter. This has the effect of shifting phase of the reference ramp immediately.

The frequency correction is accomplished largely by the frequency correction signal over line 20. This frequency correction signal is divided evenly between the start and stop values utilized at the reference counter. As will be hereinafter described, the scaled digital frequency correction for the start and stop values is usually a whole number and a fraction. To handle the fraction, it is necessary to add a secondary increment to the start and stop values. Thus, lines 22 and 24 are provided to carry the start and stop increments, when required.

Figure 2:
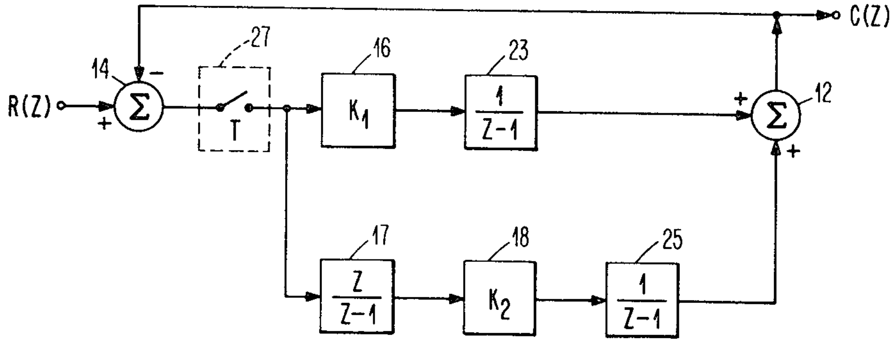
FIG. 2 is a block diagram of transfer functions for the preferred embodiment of the invention.

In FIG. 2, the block transfer functions for the preferred embodiment of the invention are shown. Switch 27 indicates that the system is a time-sampled system having a base period T between data pulses. R(z) may be thought of as the data input to the phase-lock loop, while C(z) is the output of the phase-lock loop. In this invention, C(z) provides a reference from which the subsequent error between the reference and data pulses is determined, and is also used to realize a data gate.

Figure 3:
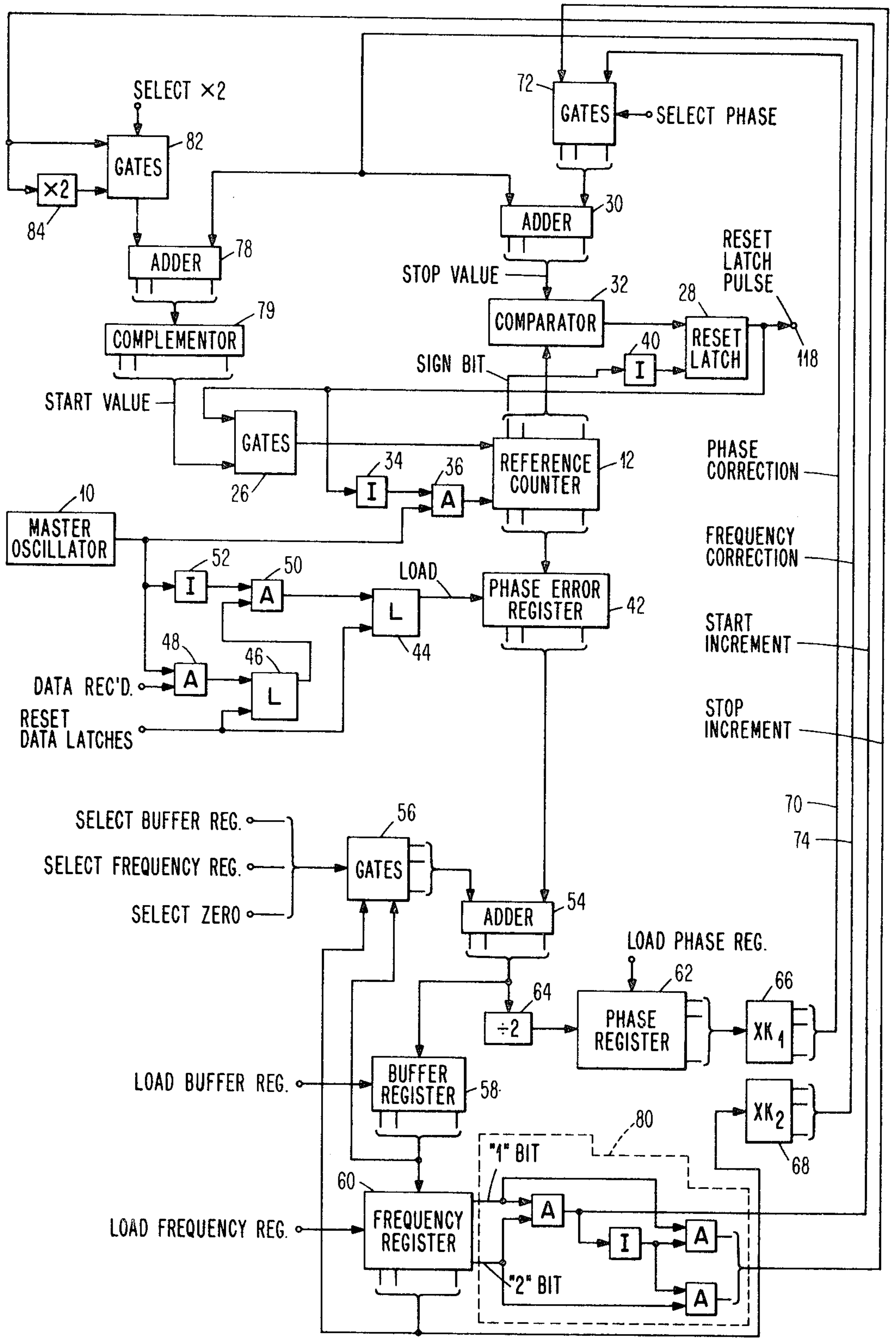
FIG. 3 is a more detailed block diagram of the all-digital phase-lock loop represented in FIG. 1.

The block diagram in FIGS. 1 and 3 represent one implementation of the transfer functions in FIG. 2. It will be apparent to one skilled in the art that there are alternative hardware implementations for these basic transfer functions. As can be seen in FIG. 2, the basic phase-lock loop monitors the phase error directly to make the scaled phase correction and monitors the phase error as an indication of change in frequency to make a scaled frequency correction.

Relating FIG. 2 to FIG. 1, the transfer functions in FIG. 2 have been given the same reference numerals as their counterpart implementation in FIG. 1. Thus, the reference counter 12 is represented as a summation point, and, similarly, the phase detector 14 is represented as a summation point. The phase scaler 16 operates directly on the phase error from summing point 14, is delayed by a delay 23, and is applied to the reference counter summing point 12. The delay 23 is merely a result of this particular implementation and puts the phase correction in at summing point 12. The application of the phase correction in FIG. 1 is accomplished by the gating of the stop controls for the reference counter 12.

The frequency correction in FIG. 2 is also made from the phase error with the phase error being applied to a memory transfer function 17 before being applied to the scaler 18. The memory function tracks the frequency of the input signal R(z) based upon phase error indications. The output of the memory function is scaled by scaler 18 to generate the frequency correction. The frequency correction encounters a delay 25 and is then applied to the summing point 12.

From the diagram of transfer functions in FIG. 2, the desired constants $K_1$ and $K_2$ for scalers 16 and 18 in FIG. 1 may be calculated. The expressions for constants $K_1$ and $K_2$ are derived from the block transfer functions and are given below.

$$2-K_1-K_2=2e^{-\zeta\omega_n T}\cos\left(\omega_n T\sqrt{1-\zeta^2}\right)$$
$$1-K_2=e^{-2\zeta\omega_n T}$$

Where:

$\zeta$ is the damping factor;

$\omega_n$ is the undamped natural frequency;

$T$ is the base period between data pulses.

Solving the above equations will generally lead to an imperfect fraction for each scaler. For ease of implementation, as will be seen in FIG. 3, this imperfect fraction was rounded off to the nearest binary equivalent, such as ½, ¼, ⅛, 1/16, etc.

To understand the detailed operation of the preferred embodiment, reference is now made to FIG. 3. Master oscillator 10 and reference counter 12 appear in both FIGS. 1 and 3. In FIG. 3, the details of the phase detector 14, phase scaler 16, frequency memory 17, frequency scaler 18, and the start and stop controls for the reference counter 12 have been added.

The start value for the counter 12 is loaded into the counter via gates 26. Gates 26 are made up of parallel AND gates all enabled by the output of reset latch 28. Thus, all bits of the start value are loaded in parallel via gates 26 to the reference counter 12.

The enabling signal for gates 26 is generated by the set condition in reset latch 28. Reset latch 28 is set when the count in reference counter 12 matches the stop value from adder 30. Comparator 32 continuously monitors the contents of the reference counter 12 and generates an output pulse when the count in the counter 12 matches the stop value received from adder 30. Thus, the limits of the ramp signal simulated by the reference counter 12 are specified by loading in a start value via gates 26 and comparing the count in the counter 12, as it is advanced, to a stop value from adder 30.

When the reset latch 28 is set, its output is inverted by inverter 34 and inhibits AND-gate 36. AND-gate 36 is used to control the passage of advance pulses from master oscillator 10 to reference counter 12. The sign bit in reference counter 12 is used to reset the latch 28. The sign bit will be positive when the reference counter reaches a stop value. Thus, the inverter 40 will inhibit the sign bit from resetting the latch 28. However, after a new start value has been loaded into the reference counter 12 via gates 26, the sign bit will go negative. Inverter 40 then has a positive output to reset the latch 28. In this way, the reference counter 12 is continuously cycled to count from a negative start value to a positive stop value. In effect, this operation of counter 12 simulates a digital ramp signal for comparison to a data pulse to detect phase error. The data pulse will arrive at zero count in the counter 12 if there is no phase error.

To detect phase error, the contents of the reference counter 12 are monitored by the phase error register 42. Register 42 is enabled to load the contents of the counter 12 into the register when a data pulse is received. The load signal for register 42 is generated by data latches 44 and 46 and AND-gates 48 and 50. The receipt of a data pulse is indicated by the data received signal applied to AND-gate 48.

The data received signal is generated from the data pulse and stays up until the digital corrections have been calculated. This prevents the loop from trying to adjust to two data pulses simultaneously. In other words, the data received signal will go positive when a data pulse is received and will stay positive until calculation of the phase correction and frequency correction factors are complete. If a second data pulse were to occur in the interim, it would be ignored by the phase-lock loop.

The function of the AND-gates 48 and 50 with the latches 46 and 44 is to ensure that reference counter 12 will have settled to a count before the load command is given to the phase error register 42. AND-gate 48 is enabled by a positive level out of the master oscillator 10 and loads latch 46. AND-gate 50 is enabled by a negative level out of the master oscillator 10 because of the inverter 52. AND-gate 50 passes the load command from latch 46 to latch 44 which then causes the phase error register to load the phase error count from reference counter 12.

With the phase error loaded into register 42, the phase detection indicated by detector 14 in FIG. 1 is complete and the generation of the phase correction from the phase error signal begins. The phase error is passed as a binary number in parallel to the adder 54. The adder 54 will add the phase error to the binary value received from gates 56.

Gates 56 are selectively energized to pass either the contents of buffer register 58 to the adder, or the contents of frequency register 60 to the adder. The output of the adder 54 is monitored by the phase register 62. After the calculation has been made, a load phase register command enables the phase register 62 to receive and store the average phase error.

The average phase error is made up of the addition of previous detected phase error plus the present phase error divided by 2.

$$P_{AVE}=\frac{P(t)+P(t-1)}{2}$$

Where:

$P(t)$ is present phase error; and $P(t-1)$ is previous phase error.

Accordingly, there is provided a division-by-2 function 64. This function can simply be attained by monitoring the output of the adder 54 shifted one bit to the right. As is well known, division of binary numbers by factors of 2 is accomplished by shifting the dividend to the right. Each shift of a bit position constitutes one division by a factor of 2.

The calculation of phase correction is completed by multiplying the phase error average in register 62 by the constant $K_1$. If the phase error average feature is not used, then buffer register 58 and divider 64 may be omitted from FIG. 2. The phase error is then loaded into register 62 without averaging.

To calculate the frequency correction, the frequency register 60 is updated by adding the contents of the phase error register 42 to the contents of frequency register 60. The contents of register 60 are gated to adder 54 by gates 56 when the select frequency register signal is present. The summation is performed by adder 54 and the sum is passed back to the frequency register 60 via the buffer register 58. An expression for the updated frequency value loaded into register 60 is as follows:

$$f(t)=P(t)+f(t-1)$$

Where:

$f(t)$ represents frequency value as updated; and $f(t-1)$ is the previous frequency value.

When the phase correction and frequency correction values have been loaded into the registers 60 and 62, the scaling operation proceeds by multiplying these values by constants $K_1$ and $K_2$, respectively. As previously explained, the optimum values of $K_1$ and $K_2$ may be calculated. For ease of implementation in the present system, $K_1$ and $K_2$ were chosen as fractional factors of 2. For example, $K_1$ was chosen to be ½ and $K_2$ was chosen to be ¼. Thus, the functional blocks 66 and 68 may be implemented by shifting the output from the correction registers one or two bit positions. As previously explained, this is equivalent to dividing by 2 or by 4, as is appropriate for each constant.

The scaled phase correction value is then passed via line 70 to the gates 72 on the stop side of the reference counter. A phase correction is made if the select phase signal enables the appropriate gates in gate 72 to pass the phase correction signal from line 70 to the adder 30. The phase correction signal will then increase or decrease the stop value in accordance with whether the signal is positive or negative. The other input to the adder 30 is the frequency correction signal on line 74. The frequency correction signal is applied to both the stop value and the start value (i.e., symmetrical frequency correction). Thus, the updated frequency correction factor and the phase correction factor are added at adder 30 and used to generate the stop value at the output of adder 30 during phase correction.

The start value is updated by adding the frequency correction to appropriate increment signals in the adder 78. Note that increment signals are applied both to the start and stop values. The start increment and stop increment values are generated by monitoring the binary "one" bit and "two" bit positions in the frequency register 60.

The necessity for start and stop increments occurs because the frequency correction is divided by 4, and this division leaves the possibility of a remainder. The division by 4 is accomplished by the $K_2$ scaler 68.

The multiplication of the updated frequency in register 60 by the scaler ¼ sets up the basic end points for the reference ramp. However, except when the updated frequency is a multiple of 4, the division will leave a remainder. To apply this remainder as a correction for the start and stop values is the purpose of the start and stop increment signals. There are three possible remainders representing the values 1, 2, and 3.

The feeding of correction values into the start and stop values is split into four occurrences—two start value occurrences and two stop value occurrences. The first start value occurrence is used to feed in the phase correction. This leaves three occurrences, two start and one stop, to feed in any combination of required increments. A nearly symmetrical feeding of increments was accomplished by letting the start increment be fed in twice—the first time being multiplied by 1 and the second time being multiplied by 2—and letting the stop increment be fed in once.

To satisfy these conditions, it will become evident that for a remainder of 1, that stop increment takes on a value 1 and the start increment takes on a value 0. For a remainder of 2, the stop increment takes on a value of 2, and the start increment takes on a value of 0. Finally, for a remainder of 3, the start increment takes on a value of 1, and the stop increment takes on a value of 0. The generation of start and stop increment signals is taken care of by the logic 80 which monitors the binary "one" bit and "two" bit in the frequency register 60. These bits make up the remainder of a division by 4 of the contents of the frequency register 60.

The stop increment is added to the frequency correction factor by the adder 30 when the select phase signal is not present on the gates 72. In other words, in the normal situation the gates 72 pass the stop increment signal to adder 30, but when the select phase signal is present, the gates 72 pass the phase correction. Similarly, gates 82 control the passage of the start increment signal to adder 78. When a select "×2" signal is present on the gates 82, the start increment multiplied by 2 by functional block 84 is passed to the adder 78. When there is no select "×2" signal on gates 82, the gates pass the start increment signal directly to the adder 78 without multiplication.

OPERATION OF PREFERRED EMBODIMENT

Figure 4:
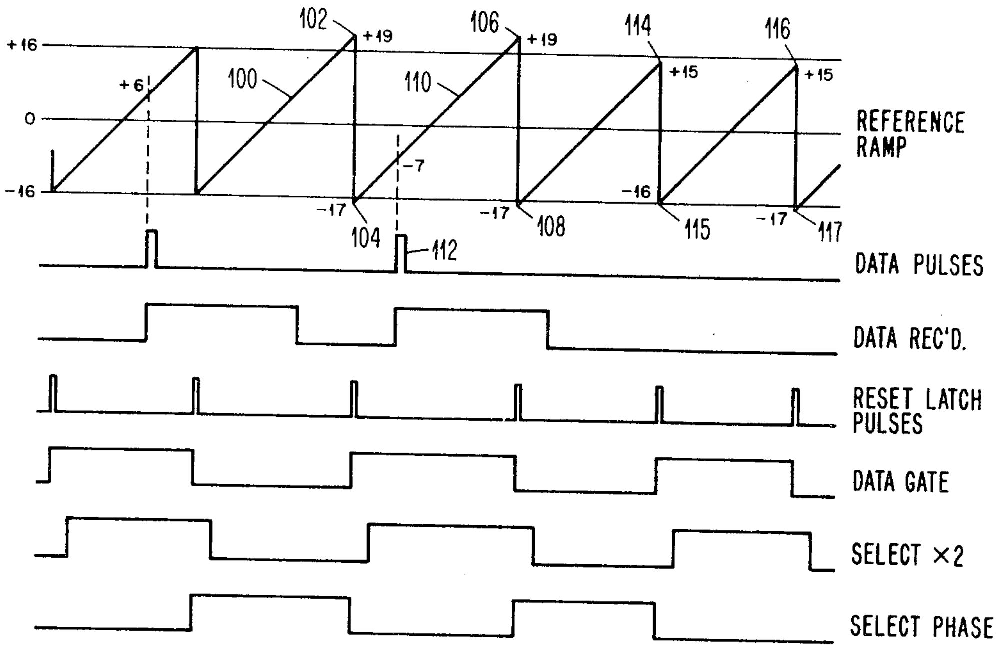
FIG. 4 shows some example waveforms indicating the adjustment of the reference ramp when data pulses are early or late.

Referring now to FIGS. 3 and 4 in combination, examples of a data pulse arriving early and a data pulse arriving late will be discussed as to their effect on the phase-lock loop in FIG. 3. The system is initialized by setting a value of 64 into the frequency register 60 and setting the reference counter to zero. All other registers, latches, and flip-flops are set to 0, except flip-flop 134 (FIG. 5) which is reset to one by the first data pulse received. When the first data pulse is received, the counter 12 is enabled and begins to count from 0 to the stop value +16. With the frequency register 60 containing a count of 64, the next start value of the reference counter will be −16 and the stop value is +16. Of course, any value could have been loaded into the frequency register so as to produce initial start and stop values. The resolution of the system can be increased by increasing the value in the frequency register 60 and thereby increasing the start and stop values. With the system initialized and the data being received, the reference counter will proceed to count between start and stop values and thereby simulate a reference ramp signal.

The examples in FIG. 4 depict an extreme condition where two data pulses are abnormally close because the first pulse is received late and the succeeding pulse is received early. The adjustment of the start and stop values and thereby the reference ramp will show how the system responds to this extreme condition.

Assuming the first data pulse arrives six counts late, the reference counter 12 will be at a +6 count when the load signal from data latch 44 causes the phase error register 42 to load the +6 count into the register. The first frequency or phase correction of the system occurs at the second flyback of the reference ramp after the data pulse is received. The loop requires a certain amount of time to calculate the phase and frequency corrections. This time is represented in FIG. 4 by the duration of the up level of the data-received signal. The timing for the correction is accomplished by the select phase and select "×2" gate signals which are depicted in FIG. 4. The generation of these gate signals will be described hereinafter.

Returning again to FIG. 3, the phase error of +6 is presently in the phase error register. By symbolic representation, this phase error is identified as $P(t)$.

To find the new average phase error, adder 54 adds the present phase error from the register 42 to the previous phase error from register 58. The sum is divided by 2 and stored in the phase register 62. Assuming that the previous phase error was +2, the average phase error stored in the phase register 62 is +4, as shown below.

$$P_{AVE}=\frac{P(t)+P(t-1)}{2}=\frac{+6+2}{2}=+4$$

To update the frequency register 60, the previous frequency value stored in register 60 is added to the phase error from register 42 by adder 54. Assuming the previous frequency quantity was 64 (normal), the new sum is 70. The value 70 is first loaded into the buffer register 58 and then immediately thereafter loaded into the frequency register 60.

$$f(t)=P(t)+f(t-1)$$
$$f(t)=+6+64=70$$

To preserve the present phase error for use in phase error averaging after the receipt of the next data pulse, the contents of the phase error register are added to 0 by inhibiting the gates 56 with a select zero signal and then stored in the buffer register 58. In effect, the phase error is transferred from register 42 to register 58. With the phase and frequency values stored in registers 60 and 62, the system is now ready to update the start and stop values. The value in the frequency register 60 is divided by 4 (scaling constant $K_2$ is ¼) and applied to the adders 30 and 78. Since the value in the frequency register is now 70, division by 4 gives 17 and leaves a remainder of 2. Accordingly, a value of 17 is applied to the adders 30 and 78 over line 74. The remainder of 2 is decoded by the logic 80 into a start increment signal of 0 and a stop increment signal of value 2.

Thus in FIG. 4, during ramp 100, the select phase signal comes up and the stop value is changed to +19 by the addition of the frequency correction 17 to the phase correction +2. The quantity in the phase register is +4, and the phase correction scaler is ½ so, therefore, the phase correction is a +2. The value +19 for the new stop value occurs at point 102 on the ramp on FIG. 4. The new start value during this flyback is −17 at point 104. The value −17 is the result of adder 78 adding the frequency correction of 17 to the increment value received through the gates 82. In this case, the start increment is 0. Thus the output of the adder is 17 which is complemented by complementor 79 to arrive at the updated start value of −17 at point 104 in FIG. 3. The stop value at point 106 is the result of adding 17 to the stop increment which is + 2. Thus, the new updated stop value is +19 at point 106. The stop increment of +2 is passed by gate 72 since the select phase signal is no longer present. Thus, adder 30 can add the +2 to the value 17 to arrive at the new stop value. The new start value during the same flyback at point 108 in FIG. 3 is −17 since the start value is calculated by adding the frequency correction to 2 times the start increment and the start increment is 0. Therefore, the new start value is −17.

During the ramp 110, the next data pulse is received. Data pulse 112 at time $t+1$ is extremely early, and the new phase error which will be loaded into phase error register 42 in FIG. 2 is −7. Shown below are the calculations for the new values in the phase register, the frequency register, the phase and frequency correction values and the start increment and stop increment values.

$P(t+1)=-7$ $P(t)=+6$ $$P_{AVE}=\frac{P(t)+P(t+1)}{2}=-\frac{1}{2}\rightarrow 0$$

∴ Phase Correction =0/4=0

$f(t+1)=P(t+1)+f(t)$ $=-7+70=63$

∴ Frequency Correction =63/4=15

Start Increment =1

Stop Increment =0

As can be seen in the above calculations, the new symmetrical frequency correction value is 15; the new phase correction value is 0; the start increment is 1; and the stop increment is 0. Accordingly, gates 72 and 82, as controlled by the select phase and select "×2" signals of FIG. 3 will change the start and stop values at points 114, 115, 116, and 117 to the following values, respectively—+15, −16, +15, and −17.

In FIG. 4, the only remaining signals of interest are the reset latch output and the data gate. The reset latch pulses at terminal 118 in FIG. 3 is the output utilized to generate a data gate signal. The data gate is used to gate data pulses to the data decoding hardware (not shown). Thus, the output of the system may be looked upon as the generation of the reset latch pulses or more particularly the data gate so that this gate signal will track the data pulse as it shifts in phase relative to the reference ramp.

Figure 5:
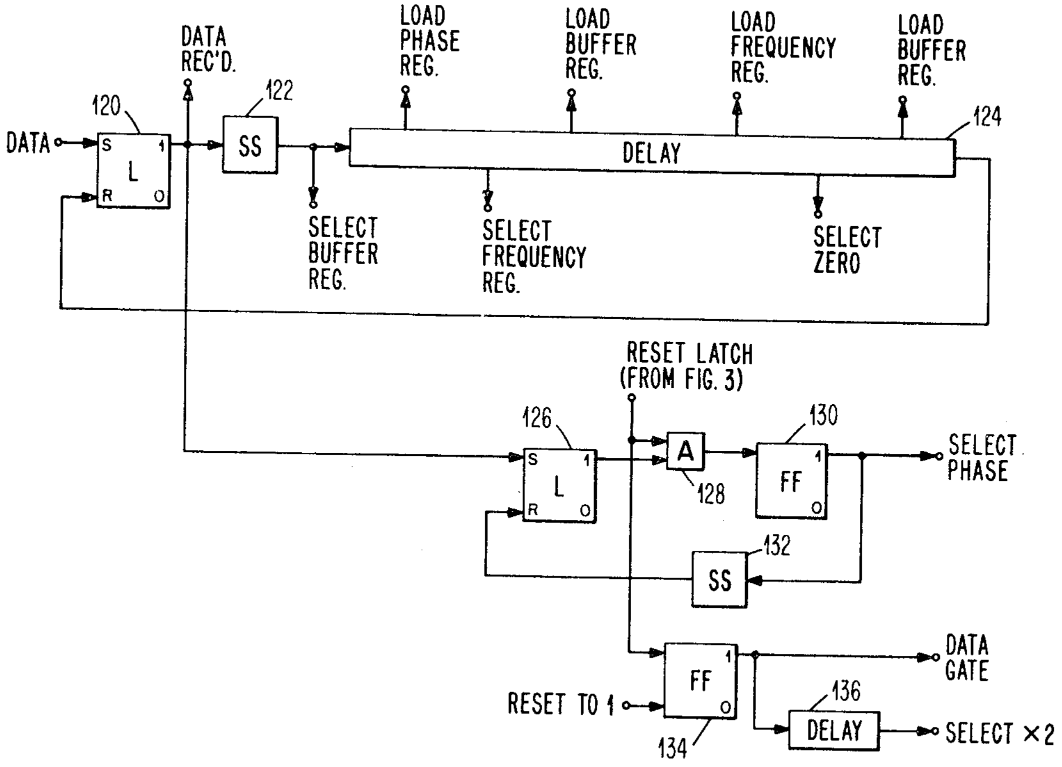
FIG. 5 is a block diagram of apparatus providing control signals utilized in FIG. 3.

In FIG. 5, apparatus is shown to generate the control signals and the data gate signals referred to in FIGS. 3 and 4. The data pulses depicted in FIG. 4 are applied to the set terminal of latch 120. The output of latch 120 is the data-received signal depicted in FIG. 4. Latch 120 is reset after the updated phase and frequency values have been stored in registers 60 and 62.

Single-shot 122 will generate a pulse of short duration each time latch 120 is set by a data pulse. The pulse from single-shot 122 then propagates down a tapped delay line. The select and load signals are pulled off the delay line at intervals to permit the sequential calculations performed in FIG. 3. The final output of the delay line 124 is passed back to reset the latch 120. Thus, the latch 120 will ignore any other data pulses received during the interval of time it takes the pulse from single-shot 122 to propagate through the delay line. Of course, other apparatus could be used to generate these select and load signals, such as a counter, shift register, or read only memory.

The output of the latch 120 is also used by latch 126 to control the generation of the select phase signal for gates 72 in FIG. 2. Latch 126 in FIG. 5 is set by the data-received signal indicating that a data pulse has been received. Latch 126 then enables AND-gate 128 to pass the next reset latch signal received from reset latch 28 in FIG. 2. This reset latch signal occurs during the flyback of the reference ramp. The reset latch signal is passed by AND-gate 128 and used to change the state of flip-flop 130. Flip-flop 130 is initially in a 0 state and will change state each time it receives a pulse from AND-gate 128. Thus, the first reset latch signal after a data pulse causes flip-flop 130 to go to the binary 1 state. This up level out of flip-flop 130 is the select phase signal utilized by gates 72. When the next reset latch signal occurs during the next flyback of the reference ramp, flip-flop 130 changes to the 0 state, and the select phase signal goes negative. The trailing edge of the select phase signal triggers single-shot 132 which generates a pulse to reset the latch 126 to look for the next indication of a received data pulse.

The reset latch pulse from reset latch 28 in FIG. 3 is also used in FIG. 5 to change the state of flip-flop 134. Flip-flop 134 generates the data gate waveform shown in FIG. 4. Initially flip-flop 134 is set to a one state just prior to the first data pulse so that thereafter its output will rise to an up level during the reference ramp thereby bracketing each data pulse. Also the data gate signal is delayed by delay 136 and utilized to generate the select "×2" signal for gates 82 in FIG. 2. The select "×2" signal is shown in FIG. 4.

In conclusion, there are many ways to implement the transfer functions in FIG. 2. Most functional blocks in FIG. 3 can be substituted with different logical hardware to perform the same function. It should also be realized that the operations performed by this hardware may be done with a computer program or microprogram subroutine. The basic function is the separate generation of phase and frequency correction factors from the phase error wherein a frequency memory tracks the frequency variations of the data pulses by monitoring the phase error, and wherein the frequency correction is based upon the continuously updated frequency in the frequency memory. Symmetrical frequency correction and phase error averaging are additional features.

While the invention has been particularly shown and described with reference to a preferred embodiment thereof, it will be understood by those skilled in the art that various changes in form and details may be made therein without departing from the spirit and scope of the invention.

What is claimed is:

1. Digital phase-lock loop apparatus for synchronizing a digital reference clock signal with an incoming data signal comprising:
   - an adjustable digital source of reference clock signals for generating a digital reference clock signal adjustable in phase and frequency;
   - means for detecting the phase error between the incoming data signal and the digital reference clock signal;
   - means responsive to the phase error for generating a digital phase correction signal;
   - means responsive to the phase error for tracking frequency variations in the data signal and indicating the updated frequency;
   - means responsive to the updated frequency for generating a digital frequency correction signal;
   - said source responsive to the phase correction and the frequency correction signals for adjusting digitally the phase and frequency of the digital reference clock signal.

2. The apparatus of claim 1 wherein said adjustable digital source comprises:
   - counting means for simulating a reference ramp clock signal by cyclically counting between a start value and a stop value.

3. The apparatus of claim 2 and in addition:
   - means for applying said digital frequency correction substantially equally to both the start and stop values of said counter whereby the period of the reference ramp clock signal is adjusted symmetrically.

4. The apparatus of claim 1 wherein said means for generating a phase correction signal comprises:
   - means responsive to the phase error for digitally averaging the present phase error with previous phase error;
   - means responsive to the phase error average for digitally scaling the average and thereby generating the digital phase correction signal.

5. A digital phase-lock loop for synchronizing a digital reference ramp and incoming data pulses, said loop having a counter for simulating a reference ramp, a phase detector for detecting the phase error between the reference ramp and the incoming data pulses, and an improved phase and frequency correction apparatus for the loop comprising:
   - means responsive to the phase error for generating a digital phase correction signal;
   - means responsive to the phase error for tracking variations in the base period of the data pulses and thereby indicating the current base period of the data pulses;
   - means responsive to the current base period of data pulses for scaling the period and thereby generating a digital frequency correction signal;
   - means responsive to the digital phase and frequency correction signals for adjusting the period and phase of the reference ramp so that the ramp follows phase and frequency variations in the data pulses.

6. The apparatus of claim 5 wherein said means for generating a phase correction signal comprises:
   - means responsive to the phase error for digitally averaging the present phase error with previous phase error;
   - means responsive to the phase error average for digitally scaling the average and thereby generating the digital phase correction signal.

7. The apparatus of claim 5 wherein said means for adjusting comprises:
   - means for starting the counting operation of said counter at a start value and thereby specifying one end of the reference ramp;
   - means for stopping the counting operation of said counter at a stop value and thereby specifying the other end of the reference ramp;
   - means for applying the digital frequency correction substantially equally to the start and stop values whereby the period of the reference ramp is adjusted symmetrically.

8. A method for generating digital phase and frequency corrections in digital phase-lock loop wherein incoming data pulses are compared with a digital reference signal to detect phase error, said reference signal cyclically operating between start and stop digital counts, said method comprising the steps of:
   - scaling the phase error to produce a digital phase correction quantity;
   - updating a normal frequency quantity with the phase error so that the updated frequency quantity tracks variations in the base period of the data pulses;
   - scaling the updated frequency quantity to produce a digital frequency correction quantity;
   - digitally adjusting the phase of the cyclic reference signal by adding the digital phase correction quantity to one period of the reference signal;
   - digitally adjusting the period of the cyclic reference signal by adding the digital frequency correction quantity to the period of the reference signal each cycle.

9. The method of claim 8 wherein said phase error scaling step comprises the steps of:
   - averaging the present phase error with previous phase error;
   - multiplying the average phase error by a scaler to produce the digital phase correction quantity.

10. The method of claim 8 wherein said period adjusting step comprises the steps of:
    - changing the start count for the cyclic reference signal by adding the digital frequency correction quantity to the start count;
    - changing the stop count for the cyclic reference signal by adding the digital frequency correction quantity to the stop count whereby the period of the reference signal is adjusted symmetrically.

* * * * *

PO-1050
(5/69)

UNITED STATES PATENT OFFICE
CERTIFICATE OF CORRECTION

Patent No. 3,646,452 Dated February 29, 1972

Inventor(s) ISAAC HOROWITZ, LAWRENCE A. LAURICH, and FRED W. NICCORE

It is certified that error appears in the above-identified patent and that said Letters Patent are hereby corrected as shown below:

Cover page, area [72], "Fred W. Niccone" should read --Fred W. Niccore--.

Signed and sealed this 20th day of June 1972.

(SEAL)
Attest:

EDWARD M.FLETCHER,JR.
Attesting Officer

ROBERT GOTTSCHALK
Commissioner of Patents